June 23, 1936.  L. A. WARD  2,045,113
PLUG VALVE
Filed Oct. 14, 1933  3 Sheets-Sheet 1
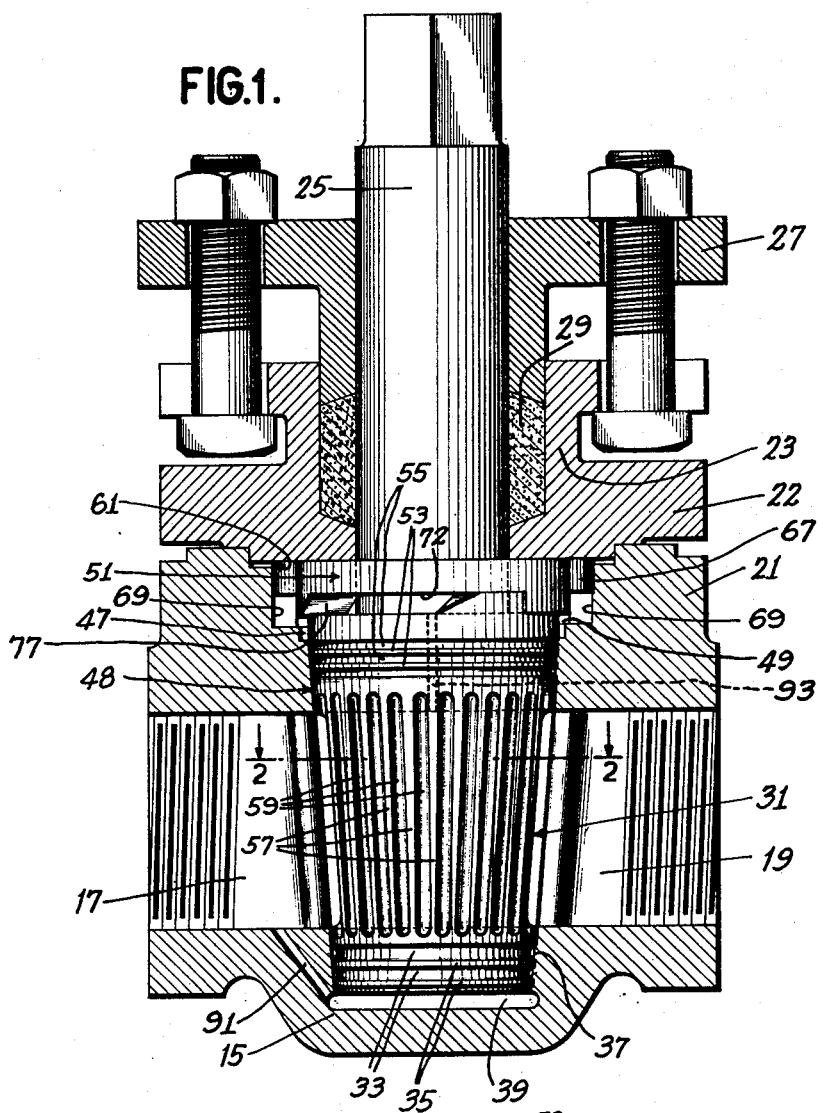
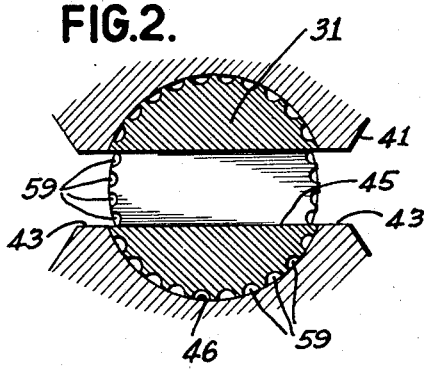
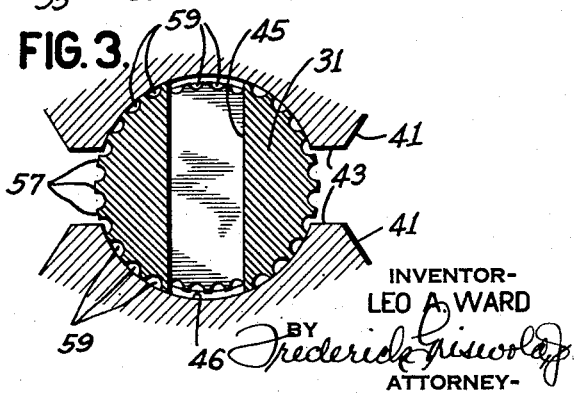
INVENTOR-
LEO A. WARD
BY Frederick Griswold
ATTORNEY- June 23, 1936.  L. A. WARD  2,045,113
PLUG VALVE
Filed Oct. 14, 1933  3 Sheets-Sheet 2
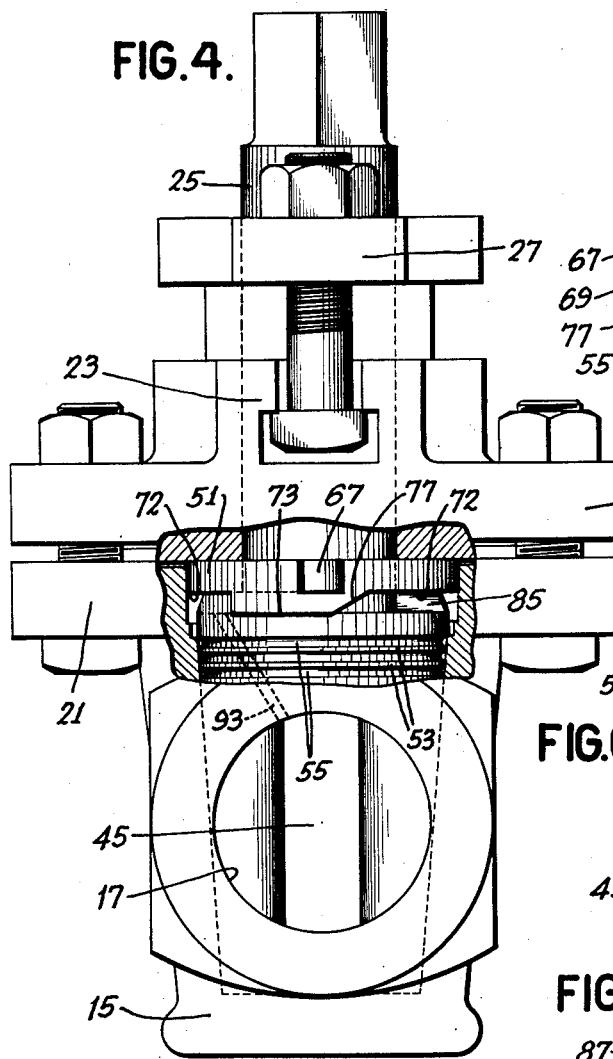
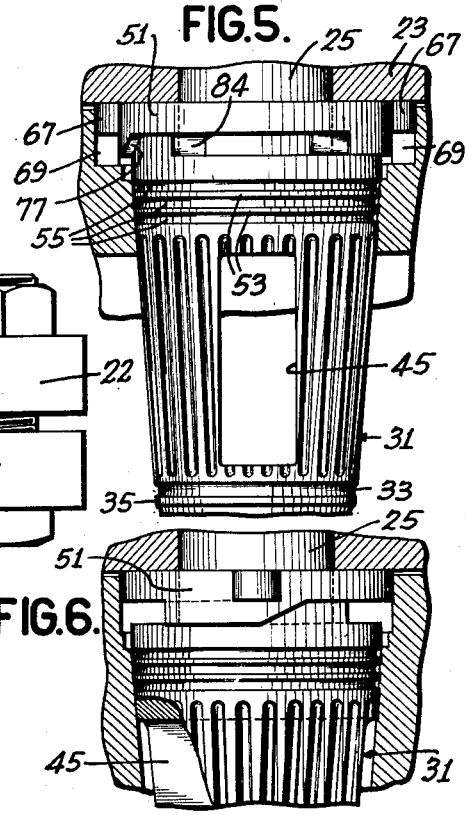
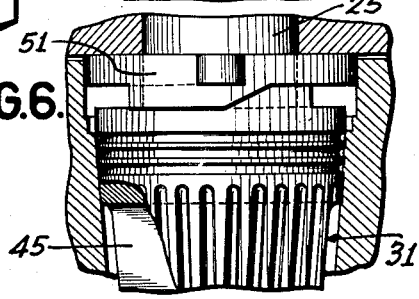
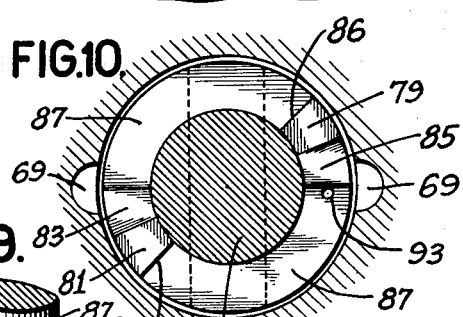
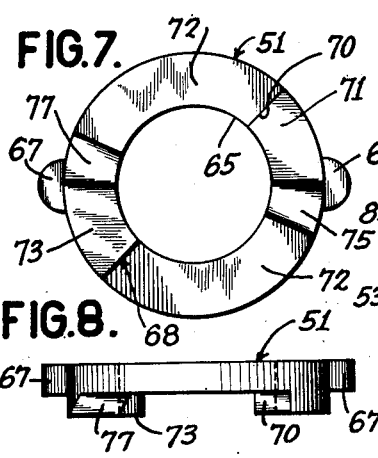
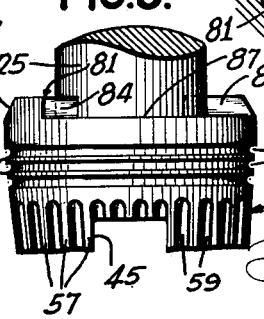
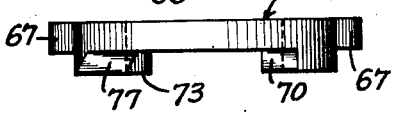
INVENTOR-
LEO A. WARD
BY Frederick Griswold Jr.
ATTORNEY June 23, 1936.                L. A. WARD                2,045,113
                              PLUG VALVE
                        Filed Oct. 14, 1933        3 Sheets-Sheet 3
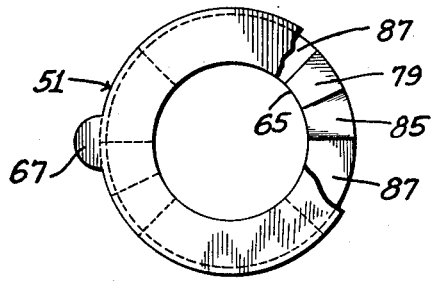
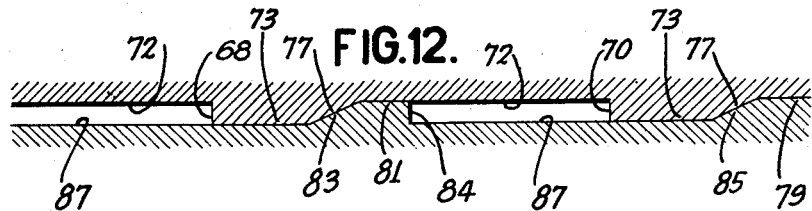
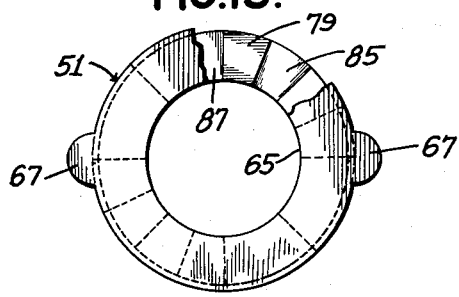
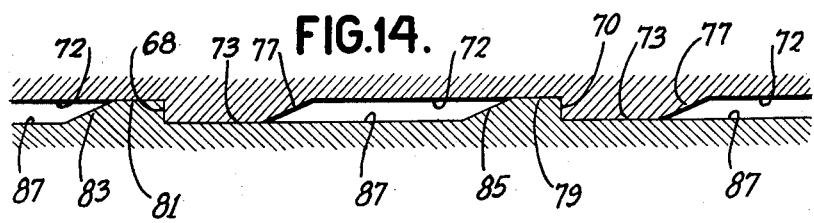
INVENTOR-
LEO A. WARD
BY
ATTORNEY Patented June 23, 1936

2,045,113

UNITED STATES PATENT OFFICE 2,045,113

PLUG VALVE

Leo A. Ward, Jersey City, N. J.

Application October 14, 1933, Serial No. 693,551

3 Claims. (Cl. 251—101)

This invention relates to valves of the kind in which an inverted frusto-conical plug is rotatable in a correspondingly shaped seat formed in the valve casing to bring a passage formed in the plug into and out of register with said fluidway.

Plug valves are frequently provided with means for applying forces to the plug in an axial direction because after the plug has been in either its open or closed position for an appreciable length of time, the plug adheres (freezes) to the seat and considerable force is necessary to overcome this adherence in order that the plug may be moved to the other position. This requires the application of powerful forces produced, say, by the use of powerful cams or fluid pressure, say, of a lubricant which breaks the adherence of the plug from its seat when it has frozen thereto in use.

The primary object of this invention is not, as heretofore, to provide means for freeing a plug, adhering (frozen) in its seat, but to so construct a plug as to prevent such adherence.

Other objects of the present invention are to improve the sealing engagement of a plug in its seat; to obviate the necessity of applying powerful forces to the plug to move and hold it as desired; to facilitate the elimination of solids between the plug and its seat; to improve the sealing of the valve through use; to prevent jamming of the plug in its seat; and to render the valve self-cleaning. Accordingly, the frusto-conical surface of the plug is formed with a plurality of ribs conveniently of substantially equal length and breadth, lying in radial planes and of a length preferably greater than the axial dimension of the fluidway through the valve. These ribs may be formed by axially extending grooves formed in the surface of the plug. The grooves define therebetween a plurality of elongated and relatively narrow compact areas adapted to bear against the seat and afford a plurality of seating areas, some or all of which are in effective sealing contact with the frusto-conical seating surface of the valve body. Where the axially extending grooves are of constant width, the ribs defined thereby are slightly wider at the upper ends, thus affording a shearing action when moving relatively to the seat and facilitating such relative movement. Where the ribs are of constant width, the contact area is less while the unit pressure between rib and seat is higher.

The surface of the plug may also, if desired, be formed with one or more peripheral grooves below and/or above the radial grooves. The peripheral grooves below the radial grooves define ribs which create a seal that makes it possible to hold the pressure of the fluidway under the plug, thereby forming a cushion that prevents jamming the plug into its seat.

Another object of the invention is the balancing of pressure on the upper and lower ends of the plug whereby the operation of the valve from open to closed position is rendered easy. To this end, the surface of the plug above the axially extending grooves may also be formed with a plurality of circumferential ribs defined by grooves. These not only create a seal in the upper part of the seat but, in addition, where a passage is formed in the body of the plug from the flow passage to a recess or space in the body above the plug, opposes the thrust of fluid pressure against the bottom of the plug and permits the valve to be readily closed.

The invention also seeks a plug valve which is practical from the standpoint of ease and cheapness of manufacture and durability and convenience in use.

These and other objects of the invention and the means for their attainment will be more apparent from the following detailed description, taken in connection with the accompanying drawings illustrating one embodiment by which the invention may be realized, and in which:

Figure 1 is a view showing a valve body in longitudinal section and a plug in elevation, to which the invention is applied, in valve open position, the groove being of constant width to form ribs progressively increasing in width toward the upper end of the plug;

Figure 2 is a fragmentary sectional view taken on the transverse plane indicated by the line 2—2 of Figure 1, and showing the plug in valve open position;

Figure 3 is a view similar to Figure 2 but showing the valve closed;

Figure 4 is an end view showing the valve of Figure 1;

Figure 5 is a fragmentary view showing the position of the plug when closed but in this instance, the ribs are shown as of constant width throughout defined by axially extending grooves progressively increasing in width toward the upper end of the plug;

Figure 6 is a fragmentary view showing the valve parts in the same relative position as that of Figure 5 but looking from the right of Figure 5;

Figure 7 is a view showing the cam ring in plan, looking from below;

Figure 8 is a view in side elevation showing the cam ring;

Figure 9 is a fragmentary view showing the surfaces on the top of the plug coacting with the cams on the cam ring;

Figure 10 is a view showing the top face of the valve, looking from above in Figure 9;

Figure 11 is a diagrammatic view showing co-acting surfaces of the cam ring and cams on top of the plug in position to apply force to the plug in a downward direction after the plug has been rotated to closed position;

Figure 12 is a developed diagrammatic view showing the relation of parts of Figure 11;

Figure 13 is a view similar to Figure 11 but showing the parts in open position; and Figure 14 is a view similar to Figure 12 showing the limiting stops for the plug in open position.

Referring first to Figures 1 and 4, a valve body is indicated at 15 formed with opposed fluidways 17 and 19 and a flange 21 at its top to which a bonnet 22 carrying the stuffing box 23, for the valve stem 25, is bolted, the stuffing box 23 having secured thereto a gland 27 by which the packing 29 is secured as a seal about the stem.

The valve of this invention is provided with an inverted frusto-conical plug 31 illustrated as provided near its lower end with at least one, and in the illustrated embodiment two, circumferential grooves 33. The lower edge of the plug is also shown as of reduced diameter, surfaces or ribs 35 defined by the grooves forming bearing areas contacting with a frusto-conical seating surface 37 formed in a recess 39 in the lower part of the body 15.

The fluidways 17, 19 become constricted, as at 41, to parallel wall portions 43 forming a passage of a cross-sectional area and shape equal to the cross-sectional area and shape of the fluidway 45, through the plug 31. The walls of the fluidway between the spaced parallel wall portions 43 are formed with a seating surface 46 of an inverted frusto-conical form which extends upwardly as an inverted frusto-conical surface, as at 48, through the body, and opens at the upper end into a cylindrical chamber of greater diameter, as at 47, and of still greater diameter, as at 49, the chamber portion 49 receiving a cam ring 51 hereinafter described.

Within the upper seat portion 48, the plug may also, if desired, be formed with at least one peripheral rib 53 defined by circumferential grooves 55, the rib or ribs forming circumferential plug surfaces of relatively small area seating on the seating surface 48.

Thus, as the plug fits into and turns or moves axially, as the case may be, in the seating surface formed by the parts 37, 46 and 48, at least one of the ribs 35 and/or 53 contacts therewith and forms a seal.

The surface of the plug, Figure 1, between the mouths of the passage 45, is formed with ribs 57 extending longitudinally between the circumferential ribs 35, 53 and 57 and lying in radial planes. These ribs 57 are defined by grooves 59 shown as having parallel sides whereby the ribs 57 are of slightly greater width at their upper ends. The entire surface of the plug between the circumferential ribs is grooved, even the areas above and below the mouths of the flow passage 45 in the plug, as shown in Figure 5. As will be obvious, in this modification, the edges of the respective ribs are angularly related to the elements of the surface of the frusto-conical seat which, as the rib moves across the surface of the seat, afford a shearing action breaking any adherence between the respective relatively movable parts. This shape rib also affords proportional contact surfaces between the plug and seat.

Where, as in Figure 5, the ribs are of constant diameter throughout, the contact area is somewhat less while the unit pressure between rib and seat is high. In some situations, it may be found advisable to use ribs of constant width whereas in other situations better results may be obtained where the ribs progressively increase in width toward the top of the plug, whereby one edge of each rib is at an angle to the elements of the seat so that when the plug is rotated the edge of the ribs exert a shearing action on the surface of the seat.

Thus, as the plug fits within the opposed walls 46, particularly in closed position, as shown in Figure 3, the vertical grooves 59 and ribs 57 form a labyrinth seal which prevents any so-called "simmering" or leakage around the plug.

The bonnet 23 is formed with a lower bearing surface 61 against which the upper surface of a cam ring 51, within the recess portion 49, bears.

The cam ring 51, Figures 7 and 8, is an annulus whereof the aperture 65 receives the valve stem 25 with a turning fit. It is formed with a pair of diametrically disposed keys 67 engaging in correspondingly shaped recesses 69 formed diametrically opposite one another in the walls of the bearing portion 49, whereby the cam ring is prevented from turning. It is formed on its under side with a pair of diametrically disposed cams (Figure 7) comprising the horizontal surfaces 71, 73 and angularly disposed or inclined cam faces 75, 77. The faces 68, 70 on the other end of the surfaces 71, 73 form stops. The horizontal surfaces 71, 73 rest on the flat top of the plug.

The flat top of the plug is also formed with correspondingly shaped cooperating cams comprising diametrically disposed upwardly projecting members formed with flat surfaces 79, 81, inclined faces 83 and 85 and stop faces 84, 86. The flat faces 79, 81 bear against and turn on the flat bottom surfaces 72 of the cam ring while the flat faces of the cams bear on the portions 87 of the top of the plug between the cams 79, 81.

The faces of the respective coacting cams 73, 75 and 83, 85 are disposed at substantially the same angle, preferably 30°, to the top face of the plug.

When the plug is turned from open position (Figures 1 and 2) to the closed position (Figures 3 and 5), the cams on the plug 83, 85 ride up on the cams 79, 81 of the cam ring to force the plug downwardly by their camming action into sealing contact with the seat. When the plug is turned from closed to open position, the first turning movement unseats the cams and releases the plug, thereby permitting it to turn freely until the shoulders 84, 86 on the plug abut against the shoulders 68, 70 on the cam ring serving as stops to limit the opening movement to that position in which the fluidway in the plug exactly registers with the fluidways in the body.

The pressure of the fluid in the fluidway may, if desired, be introduced below the plug by forming the body with a passage 91 leading from one of the fluidways 17, containing the fluid under pressure, to the recess 39 beneath the plug. As the pressure of the cams is relieved, the fluid pressure on the bottom of the plug assists in raising it slightly off its seat only sufficient to relieve the downward pressure thereby to aid in releasing it for turning movements.

When the plug is in open position, fluid pressure may, if desired, be introduced above the plug through the passage 93 leading from the fluidway 45 in the plug to the recess 47, 49 to create a balance so that the full benefits of the pressure under the plug can be used in maintaining a correct balance for ease of operation.

As compared with plug valves heretofore known, in the valve of this invention having this reduction in the seating area formed by the grooves, there is obviated the necessity of powerful cams to force and hold the plug in its seat, because with less seating surface, less total downward force is required to produce the same pressure per unit surface area. While the weight of the plug will cause it to assume a sealing seat, the cam may be provided with faces at only such angles to the vertical as will set the valve in its seat because no greater degree of force is required with the ribbed plug. Therefore, coacting cams with coacting faces inclined at such an angle, as, for instance, 30° to the vertical, will be selected which are practically self-releasing, and are only just sufficient to make and hold a perfect seal because of the high unit pressure employed at the seating contacts. Moreover, when corroded, this construction, provided with less surface area, enables the "frozen" surfaces to be more readily "broken".

A plug so constructed serves as a broaching tool preventing any carbon formation on hot oil lines or other incrustations and should any solids happen to lodge between the plug and the body, the high unit pressure can be employed to crush through them and also force any remaining objectionable particles into the vertical grooves. Moreover, any wear of the coacting surfaces that may occur is employed for obtaining increasing precision and tightness, and the seats or contacts, due to their high unit pressure, create a burnishing action which corrects blemishes or any searing on the body.

By the plug of this invention, a cushion is provided under the plug which prevents jamming while the balance port at the top of the plug is automatically closed after it has served its purpose. It will be apparent, furthermore, that by the use of ribs the contact area of the ribs somewhat approximate the amount of bearing surface of the stem, and thus an unbalanced leverage condition is corrected and there is little likelihood of a force being required to rotate the plug which is so great as to break the stem.

Various modifications will occur to those skilled in the art in the selection and adaptation of the surface configuration of the plug of this invention as well as in the means used to open and tightly close the valve, and no limitation is intended by the phraseology of the foregoing specification or illustrations in the accompanying drawings.

What is claimed is:—

1. A plug valve comprising a body formed with fluidways and an inverted frusto-conical seat, an inverted frusto-conical plug rotatable in the seat formed with a fluidway and a plurality of ribs on its surface extending in the axial direction of the plug and adapted to engage the surface of the seat, at least one edge of each of said ribs being disposed at an angle to the elements of the said frusto-conical surface.

2. A valve comprising a valve body, opposed passageways in the said valve body, a frusto-conical seat in said valve body connecting said passageways, a frusto-conical plug having a passageway therethrough, said plug being adapted to engage said seat, and a series of longitudinal grooves on the surface of said plug so as to form a series of longitudinal ribs on said surface, the edges of each of which ribs are angularly related to the elements of the said conical surface affording a shearing action to clean the valve.

3. A valve comprising a valve body, opposed passageways in the said body, a frusto-conical seat in said valve body connecting said passageways, a frusto-conical plug having a passageway therethrough, said plug being adapted to engage said seat, and a series of longitudinal grooves on the surface of said plug diverging from the smaller end of the plug so as to form a series of longitudinal ribs on said surface, the edges of each of which ribs are angularly related to the elements of the said conical surface affording a shearing action to clean the valve.

LEO A. WARD.